United States Patent
Brenner et al.

(10) Patent No.: US 9,660,235 B2
(45) Date of Patent: May 23, 2017

(54) ASSEMBLY WITH A FIRST AND A SECOND COMPONENT AND METHOD FOR PRODUCING SUCH AN ASSEMBLY

(71) Applicant: Johnson Controls Advanced Power Solutions GmbH, Hannover (DE)

(72) Inventors: Helge Brenner, Hannover (DE); Ralf Joswig, Buchholz (DE); Bernhard Ehrlich, Neustadt a. Rbge. (DE)

(73) Assignee: Johnson Controls Advanced Power Solutions GmbH, Hannover (DE)

( * ) Notice: Subject to any disclaimer, the term of this patent is extended or adjusted under 35 U.S.C. 154(b) by 336 days.

(21) Appl. No.: 14/378,302

(22) PCT Filed: Feb. 8, 2013

(86) PCT No.: PCT/EP2013/052491
§ 371 (c)(1),
(2) Date: Aug. 12, 2014

(87) PCT Pub. No.: WO2013/120770
PCT Pub. Date: Aug. 22, 2013

(65) Prior Publication Data
US 2015/0017502 A1    Jan. 15, 2015

Related U.S. Application Data

(60) Provisional application No. 61/600,623, filed on Feb. 18, 2012.

(51) Int. Cl.
| | |
|---|---|
| *H01M 2/10* | (2006.01) |
| *H01M 2/14* | (2006.01) |
| *H01M 10/6555* | (2014.01) |
| *F16B 3/00* | (2006.01) |
| *B29C 65/70* | (2006.01) |
| *B29L 9/00* | (2006.01) |
| *B29L 31/18* | (2006.01) |
| *B29L 31/34* | (2006.01) |

(52) U.S. Cl.
CPC .......... *H01M 2/1077* (2013.01); *B29C 65/70* (2013.01); *F16B 3/005* (2013.01); *H01M 2/14* (2013.01); *H01M 10/6555* (2015.04); *B29L 2009/00* (2013.01); *B29L 2031/18* (2013.01); *B29L 2031/3481* (2013.01)

(58) Field of Classification Search
CPC .... H01M 2/24; H01M 2/1077; H01M 10/655; H01M 10/6552; H01M 10/6556; H01M 10/6557; H01M 2/10; H01M 2/14; F16B 3/005; B29L 2009/00; B29L 2031/18; B29L 2031/3481
See application file for complete search history.

(56) References Cited

U.S. PATENT DOCUMENTS

| | | |
|---|---|---|
| 2007/0037050 A1 | 2/2007 | Rigobert et al. |
| 2008/0203263 A1 | 8/2008 | Carnevali |
| 2011/0159352 A1* | 6/2011 | Culver ............... H01M 2/1077 429/160 |
| 2011/0299918 A1 | 12/2011 | Parker |

FOREIGN PATENT DOCUMENTS

| | | |
|---|---|---|
| CN | 1099835 | 3/1995 |
| CN | 201149876 | 11/2008 |
| CN | 201526567 | 7/2010 |
| DE | 102007063194 A1 | 6/2009 |
| EP | 1746672 A2 | 1/2007 |
| WO | 2008103220 A1 | 8/2008 |

OTHER PUBLICATIONS

CN 201380016360.4 Second Office Action dated Mar. 9, 2016.
CN 1st Office Action dated May 29, 2015.

* cited by examiner

*Primary Examiner* — Anca Eoff
(74) *Attorney, Agent, or Firm* — Fletcher Yoder P.C.

(57) ABSTRACT

The present invention relates to an assembly (10) with a first and a second component (1, 2) which are fixed relative to each other by at least one fixation element (3), characterized by a fixation element (3) extending into or through a space (9) between the first and the second component (1, 2), wherein the fixation element (3) is filled with a hardenable filling material (61), wherein the fixation element (3) is a hollow deformable and at least in a radial direction expandable element if internally pressurized, at least before the filling material (61) hardens. The present invention also relates to a method for producing an assembly with a first and a second component.

18 Claims, 19 Drawing Sheets

Figure 3:
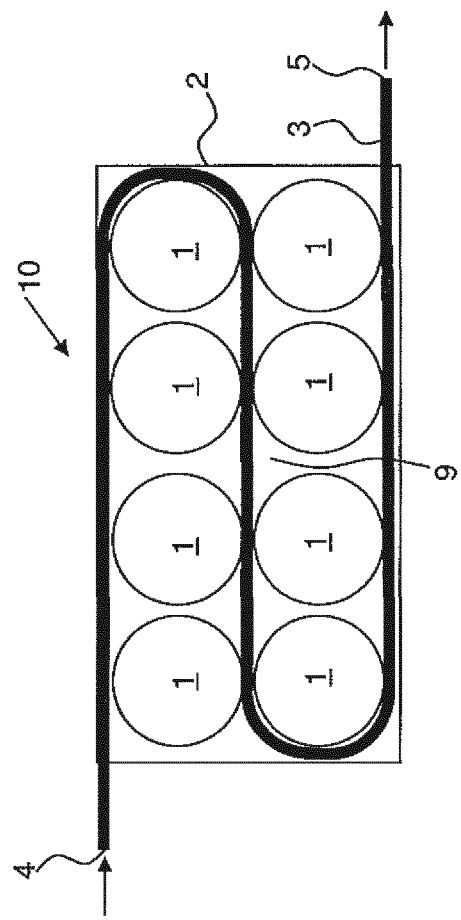

ASSEMBLY WITH A FIRST AND A SECOND COMPONENT AND METHOD FOR PRODUCING SUCH AN ASSEMBLY

CROSS REFERENCE TO RELATED APPLICATIONS

This application is a 371 of International Application No. PCT/EP2013/052491, filed Feb. 8, 2013, and which claims benefit of U.S. Provisional Application No. 61/600,623, filed Feb. 18, 2012.

The present invention relates to an assembly with a first and a second component according to claim 1. The present invention also relates to a method for producing an assembly with a first and a second component according to claim 8.

In several areas of technology there is a need for providing a fixation for fixing a first and a second component relative to each other. Known fixation means like screws and flanges or specifically formed holders require a special design with is adapted to the dimension of the first and the second component and their allocation relative to each other. In many cases a fixation means which is more universally usable, without the need of a specific shape and design, is more advantageous. There are universal fixation means available, e. g. in the form of glue, potting compound or soldering means. However, such kind of fixation means have the disadvantage that the components to be fixed can be contaminated, damaged or otherwise harmed by the fixation means. Also, it is more difficult to dismount the assembly, which makes a repair or recycling process more difficult.

It is an object of the invention to provide an assembly with a first and a second component which are fixed relative to each other by at least one fixation element, which can be universally and flexibly used and allows easy repair and recycling processes.

According to claim 1, the object of the invention is achieved by an assembly with a first and a second component which are fixed relative to each other by at least one fixation element, characterized by a fixation element extending into or through a space between the first and the second component, wherein the fixation element is filled with a hardenable filling material, wherein the fixation element is a hollow deformable and at least in a radial direction expandable element if internally pressurized, at least before the filling material hardens. The invention has the advantage that the first and the second component cannot be contaminated or damaged through a direct contact with the hardenable filling material, because the fixation element is in between and acts as a barrier. This allows using any suitable filling material, independent of its chemical compatibility with the outer surface of the first and/or second component. Another advantage is that the filling material will not adhere to the first and the second component, which allows an easy disassembly of the assembled first and second component. The fixation using the fixation element which is filled with a hardenable filling material can be used in many applications, without special adaption to the dimensions to the first and second component, because the fixation element can adapt in a flexible way to the shape of the space and to the outer dimensions of the first and the second component. In addition, tolerances of the dimensions of the first and the second component are not a problem.

As a further advantage of the invention, through the fixation element it can be controlled where the filling material flows. It can be avoided that the filling material flows to undesired locations.

As a further advantage of the invention, several commercially available means can be used as the fixation element. For example, a standard silicone tube can be used as the fixation element.

In a nutshell, the proposal is to fill a tube, e.g. a blow moulded plastic part, with a casting compound and use it as a cell adapter between battery cells and/or a housing of a battery module.

Further advantages are that there is no need for a foam material to get a tolerance compensatory when fixing battery cells, therefore there are any problems avoided that may occur due to humidity in such a foam. Further, there is no need for additional flexible parts in the battery module. No gaps between the module housing and the battery cells occur; therefore problems caused by vibrations are avoided or at least reduced. Broken module parts caused by vibrations are avoided. There is no need for a fixation unit. Using the invention, a robust battery module can be provided with very few parts, e. g. only five parts. The same battery module can be used for both air and fluid cooling systems.

According to an advantageous embodiment of the invention, the fixation element is pressed by means of the filling material against the first and the second component. This may occur only in the stage before the filling material has assumed its hardened state, or it may occur also when the filling material is in its hardened state.

The fixation element can provide the fixation of the first and the second component relative to each other in one spatial dimension, or in two spatial dimensions or in all three spatial dimensions. This allows the user a high degree of freedom in applying the invention.

The fixation element is a deformable and at least in a radial direction expandable element. In an advantageous embodiment of the invention, the fixation element comprises of thin-walled unelastic material, a thin-walled elastic material and/or a thick-walled elastic material. For example, the fixation element can be formed like a tube, a hose, or like a balloon or a bag. The fixation element can be a blow moulded plastic part or it can be welded out of two sheets of plastic foil or deep drawn plastic sheets.

According to an advantageous embodiment of the invention, the outer shape of the fixation element is at least in certain areas inversely to the outer shapes of the first and the second component. In such areas the fixation element is in contact with the first and the second component and therefore assumes their inverse outer shapes. In such a way, the fixation element can be adapted at least in certain areas to the shape of the space between the first and the second component.

Any suitable material which is a hardenable material can be used as the filling material, either a self-hardening material or a material hardenable by application of external influences, like infra-red or ultra-violet radiation or heat. For example, the filling material can be a casting compound, like a casting compound that is used for fixation of electronic components on a printed circuit board or within a housing of an electronic device. For example, an epoxy resin can be used. It is also possible to use polyurethane foam, silicone or a rubber.

Generally, it is possible to use a filling material which is in its hardened state flexible or unflexible. It is also possible to use a filling material that is in its hardened state elastic or unelastic. The selection of the appropriate filling material depends of the specific application. In case some flexibility between the first and the second component in their fixed state is required, the flexibility can be provided by using a fixation element with a required flexibility and/or using a filling material which comprises the required flexibility in its hardened state.

According to an advantageous embodiment of the invention, the filling material is a liquid material before it hardens, in particular, in low viscosity liquid material. This allows for an easy injection of the filling material into the fixation element and an equal distribution of the filling material within the fixation element. In particular, it is possible to achieve approximately the same pressure of the filling material anywhere within the fixation element, thereby producing equalised pressing forces through which the fixation element is pressed against the first and the second component.

According to an advantageous embodiment of the invention, the filling material in the fixation element is generally free of blow holes. The avoidance of such blow holes, or bubbles, has the advantage that the filling material provides for approximately the same pressing forces at any location of the fixation element and therefore equally distributed mounting forces. It is advantageous to avoid the generation of bubbles at an early stage, namely during the injection of the filling material into the fixation element.

According to an advantageous embodiment of the invention, the fixation element is connected to a heat exchanger arranged for cooling or heating the assembly. The fixation element can also be made integrally with the heat exchanger as one component. For example, it is possible to produce a heat exchanger for a plurality of battery cells in the form of a blow moulded plastic part with thin walls, which are adapted to the outer shape of the arrangement of battery cells. Such a blow moulded plastic part is also a deformable and at least in a radial direction expandable element if internally pressurised. Therefore, the blow moulded plastic part can be used either as a heat exchanger if it is only filled with heat exchanging fluid, e.g. a cooling fluid, or it can be used as a fixation element if it is filled with the hardenable filling material according to claim 1. It is also possible to manufacture heat exchanger or the blow moulded plastic part with two separate chambers or channels. In such case, one chamber or channel can be used for filling with a heat exchanging fluid, the other for filling with a hardenable filling material. As another example, there can be two separate tubes connected together or arranged within a common housing. In such case one tube can be used as a fixation element and is filled with a hardenable filling material. The other tube is used as a heat exchanging device and is filled with a heat exchanging fluid. This is particularly advantageous for assemblies requiring cooling or heating, e. g. for battery packs for hybrid and electric vehicles.

According to an advantageous embodiment of the invention, the first component is a battery cell or a plurality of battery cells, each battery cell having an own cell housing, and wherein the second component is an outer housing of the battery assembly, wherein the battery cell or the battery cells are located within the outer housing. In such a way a battery module for a hybrid or electric vehicle can be advantageously realised. The battery cells can have e. g. prismatic and/or cylindrical cell housing.

According to an advantageous embodiment of the invention, the fixation element is fixed to a carrier component, wherein the first component is located at least partly within the carrier component and wherein the carrier component is located at least partly within the second component. It is also advantageous to locate the first component completely within the carrier component and/or to locate the carrier component completely within the second component. Using the carrier component, the fixation element can be easily prepared in the required scheme for building the assembly. Because the fixation element is already fixed to the carrier component, it cannot be misadjusted in the further steps of the assembly procedure. This is particularly advantageous if the fixation element is a relatively long tube or hose which is ducted along the carrier component according to the predefined scheme. For example, the carrier component can be a metal sheet which is folded around the first component after the fixation element has been fixed to the carrier component. Of course, the fixation element is still in a state where it is deformable and expandable, when it is fixed to the carrier component.

According to claim 8, the object of the invention is achieved by a method for producing an assembly with a first and a second component, characterized in that the first and the second component are prepared with a fixation element, wherein the fixation element is a hollow deformable and at least in a radial direction expandable element if internally pressurized which is lead into or through a space between the first and the second component, wherein in the fixation element is initially not filled with a filling material, then a hardenable filling material is filled into the fixation element, until the fixation element is pressed through the filling material against the first and the second component, and then the filling material hardens or is hardened. This allows for a quick and easy fixation of the first component relative to the second component. During the filling process, or at least during the beginning of the filling process, an outlet opening of the fixation element can be opened to the atmosphere. The outlet opening is located distant from an injection opening of the fixation element where the filling material is filled into the fixation element. Through the opened outlet opening the air within the fixation element can be vented. The outlet opening shall be closed when the filling material reaches the outlet opening, in order to avoid air trapped inside the fixation element and to reduce unnecessary contamination of the ambience with the filling material.

According to an advantageous embodiment of the invention, the filling material is filled into the fixation element under overload pressure. This provides for a quick filling process as well as for robust, stable fixation because through the overload pressure the pressing forces exerted by the fixation element on the first and the second component can be increased.

According to an advantageous embodiment of the invention, the filling material modifies the outer shape of the fixation element during the process of filling of the filling material into the fixation element. In particular, the modification can be in such way that the fixation element adapts its outer shape at least in certain areas to the outer shape of the first and the second component, so that as a result the fixation element is in the certain areas inversely shaped to the outer shapes of the first and the second component.

According to an advantageous embodiment of the invention, the fixation element is first connected to a carrier component, then the first component is inserted into the carrier component in such way that the first component is at least partly surrounded by the fixation element, then the carrier component with the inserted first component is fixed to or within the second component in such way that it is at least partly surrounded by the second component. Then the aforementioned steps according to claim 8 can be performed, namely the process of filling the filling material into the fixation element.

According to an advantageous embodiment of the invention, the fixation element comprises an injection opening which is arranged for injection of the filling material into the fixation element, and the fixation element comprises an outlet opening which is distant from the injection opening, wherein the outlet opening is arranged for venting air from the fixation element during the filling process. For example, the outlet opening can be located at one end of the fixation element and the injection opening can be located at the other end.

According to an advantageous embodiment of the invention, the carrier component is bent or folded from an initial shape into a shape suitable for insertion of the first component, wherein the fixation element is fixed to the carrier component when the carrier component is in its initial shape. This provides for an easy connection of the fixation element to the carrier component, in particular if the carrier component is a flat part in its initial shape. This eases automatic processes, e. g. done by robots, of the mounting of the fixation element to the carrier component. The fixation element can be fixed to the carrier component e. g. by means of glue.

An advantageous embodiment of the invention relates to the attachment of prismatic and round cells in the module. More specifically, the present invention involves a tube is placed between the cells and module housing and has two openings. After the assembly of cells and module housing, the tube will be filled with potting compound. Here, the air located in the tube escapes through the opening while in the other opening the sealing compound is pressed. Once the air has escaped the opening will be closed, while still potting compound is pressed through the other opening. This increases the pressure in the hose. The soft tube extends down to the cells in one direction and the module housing in the other direction. The remaining opening is closed, which will keep the pressure up. The sealing compound may then harden slowly.

The tube can be replaced by a plastic part that provides a hollow space, e.g through blow moulding. The plastic part can serve two other functions. A second tube with two openings can transport cooling medium and cool the cells. Furthermore, the pressed plastic surfaces of the blow moulded part serve as electrical and thermal insulation.

Snap-hook connections along their closing, act consistently as rigid fixation in one direction only. This is due to the closing process. If the snap fit connection between the module housing parts gets closed and then the tube is filled with potting compound, the snap-hook attachment can appear in both closing directions.

The invention is now further described through exemplary embodiments and through drawings.

Figure 1:
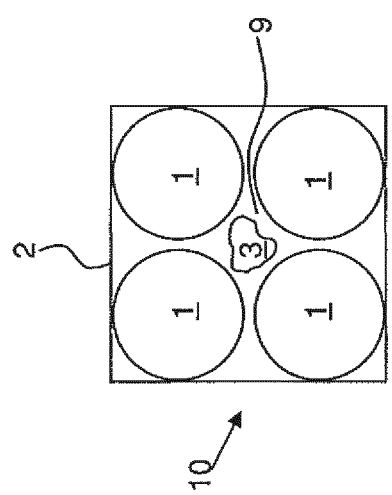
Figure 2:
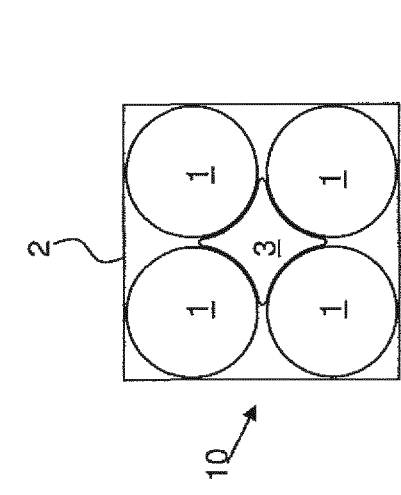

The drawings show:

FIGS. 1 and 2 a first embodiment of an assembly and

Figure 4:
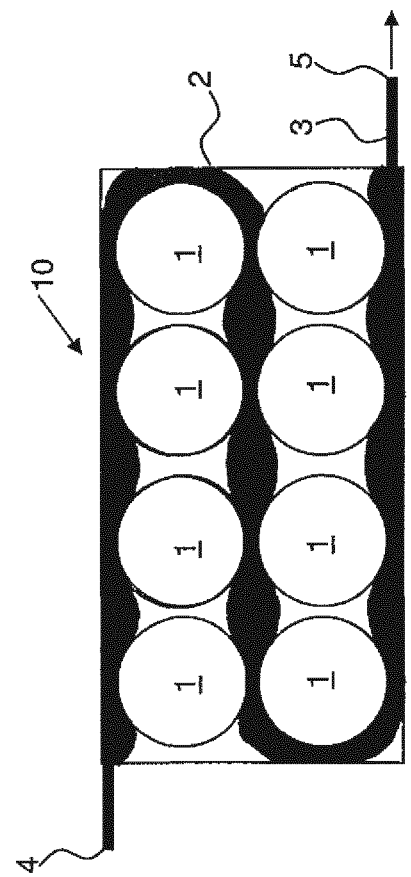

FIGS. 3 and 4 a second embodiment of an assembly and

Figure 5:
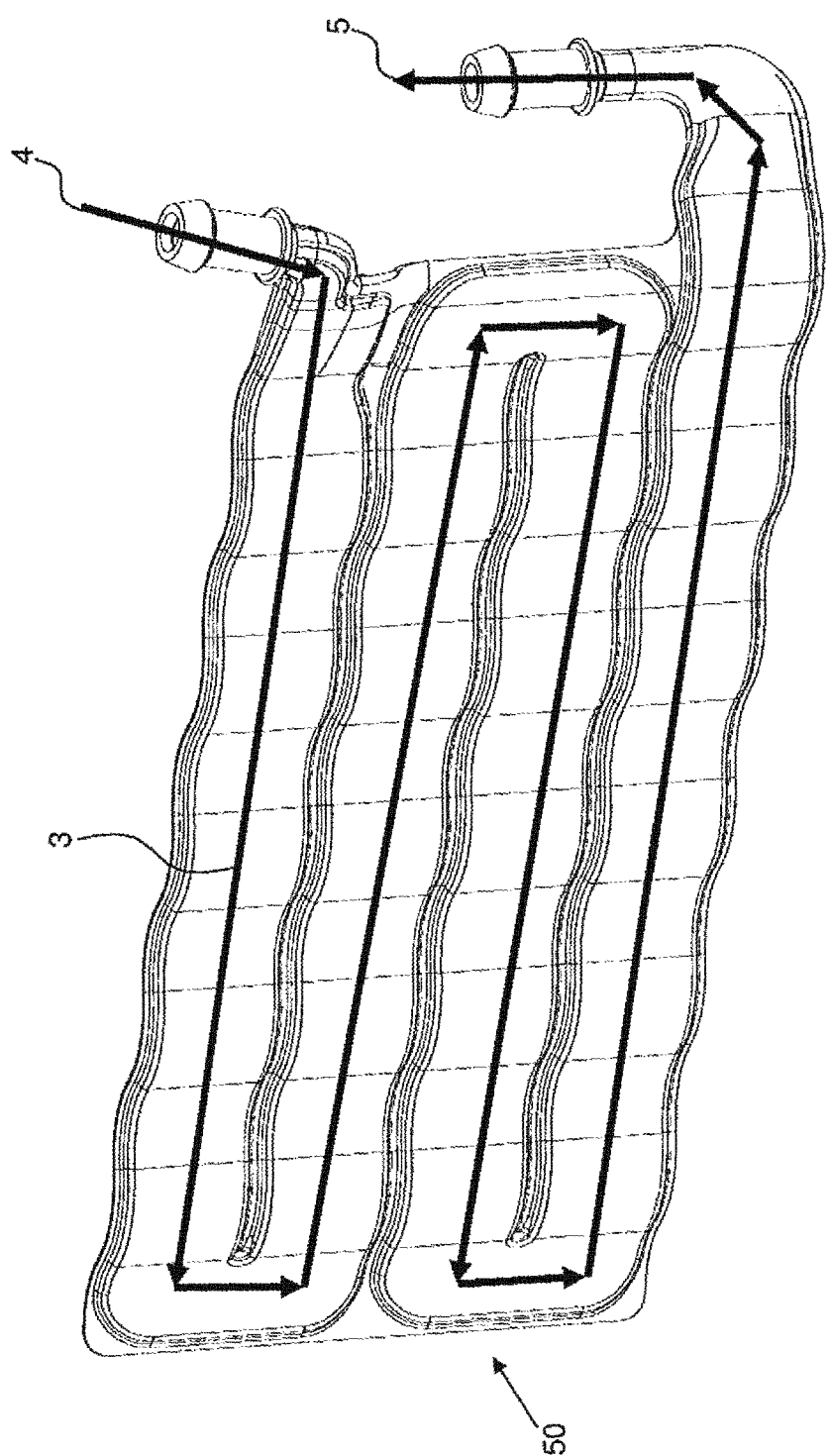

FIG. 5 a heat exchanger and

Figure 6:
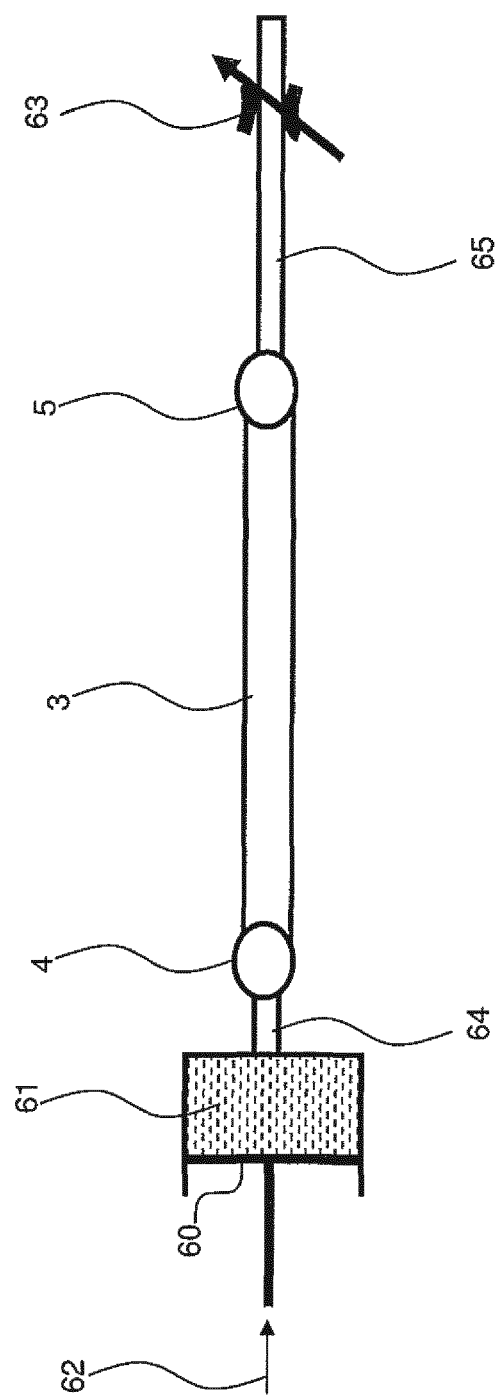

FIG. 6 a fixation element with a filling arrangement and

Figure 7:
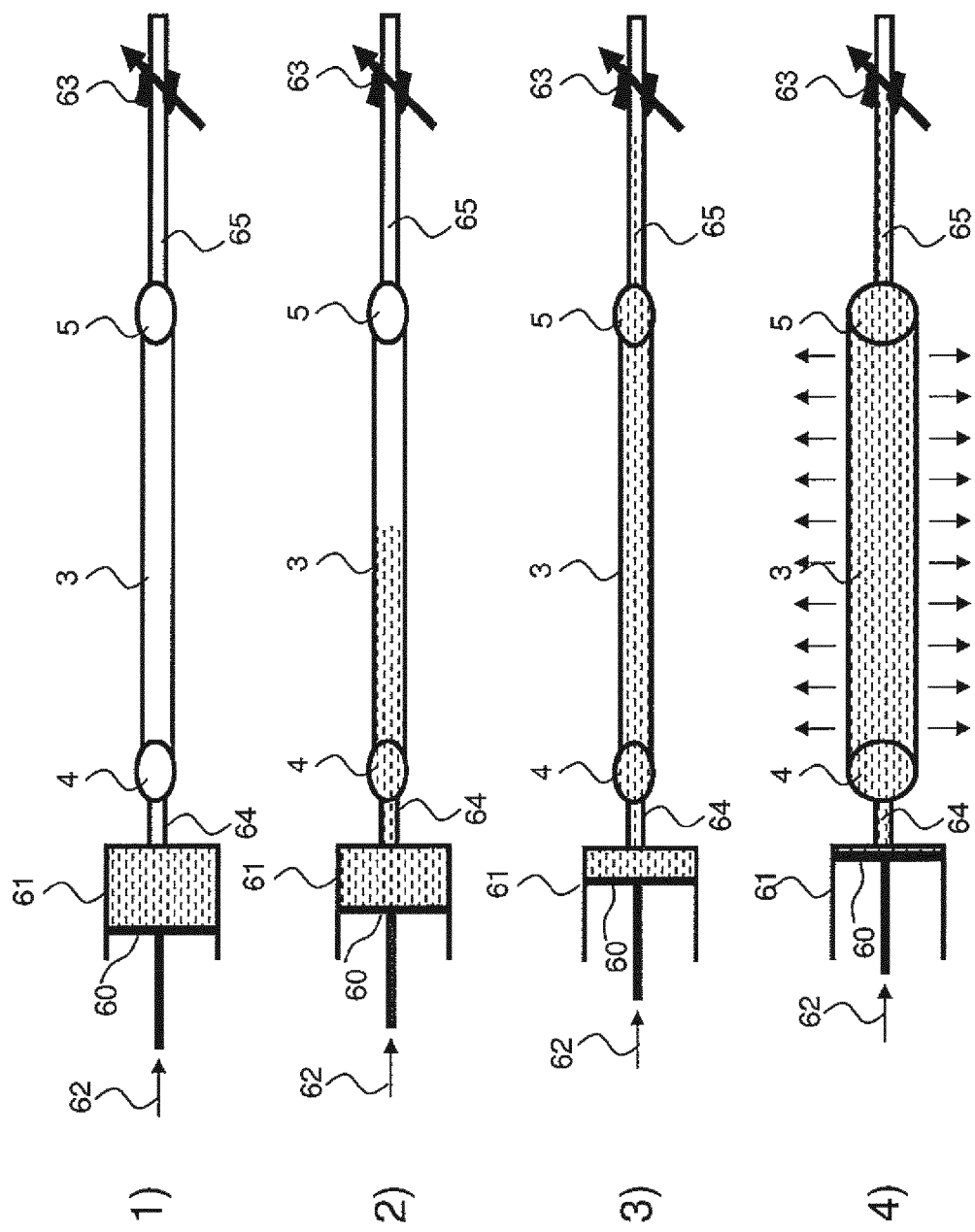
Figure 8:
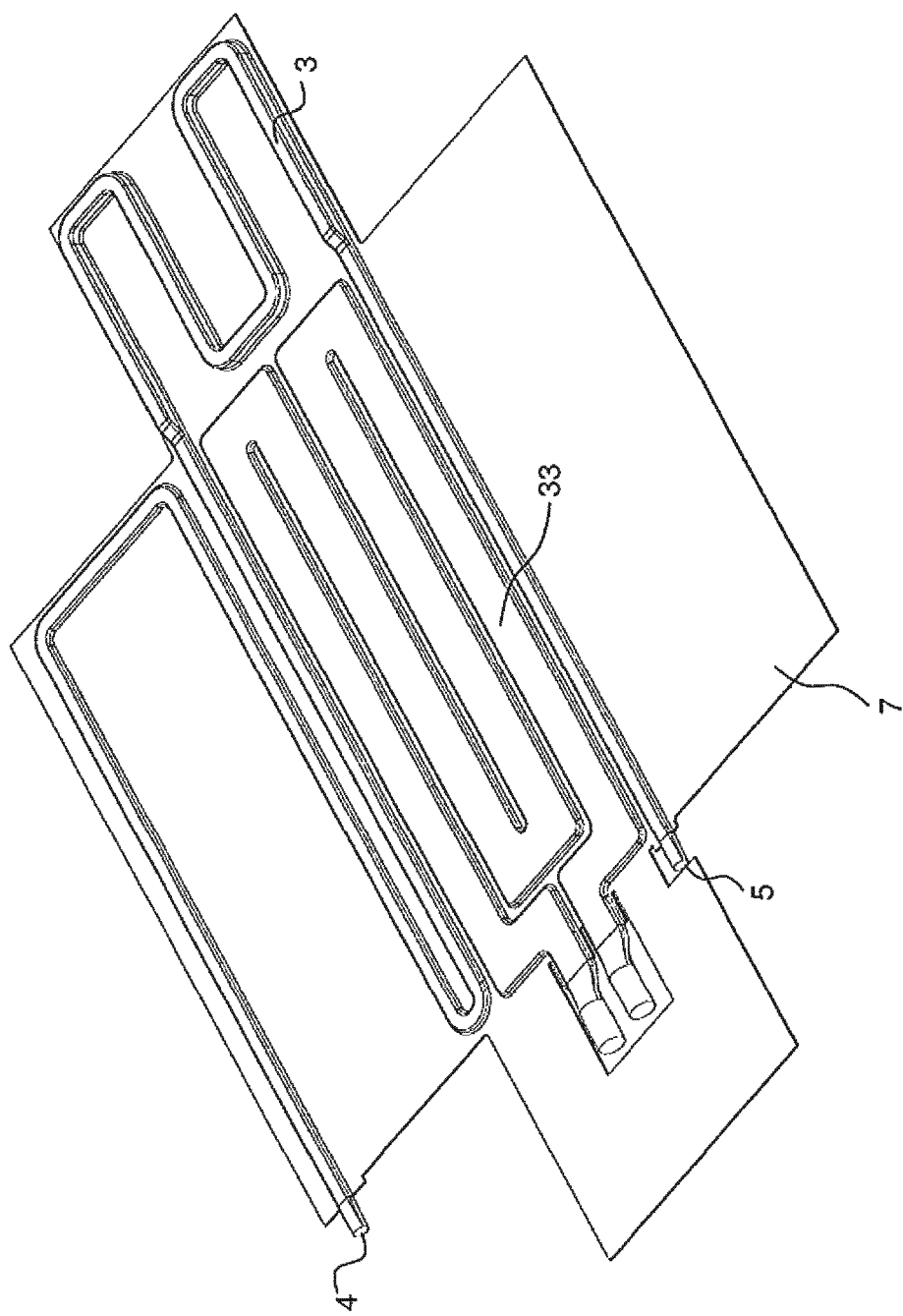

FIG. 7 the steps of the filling process of the fixation element and

Figure 18:
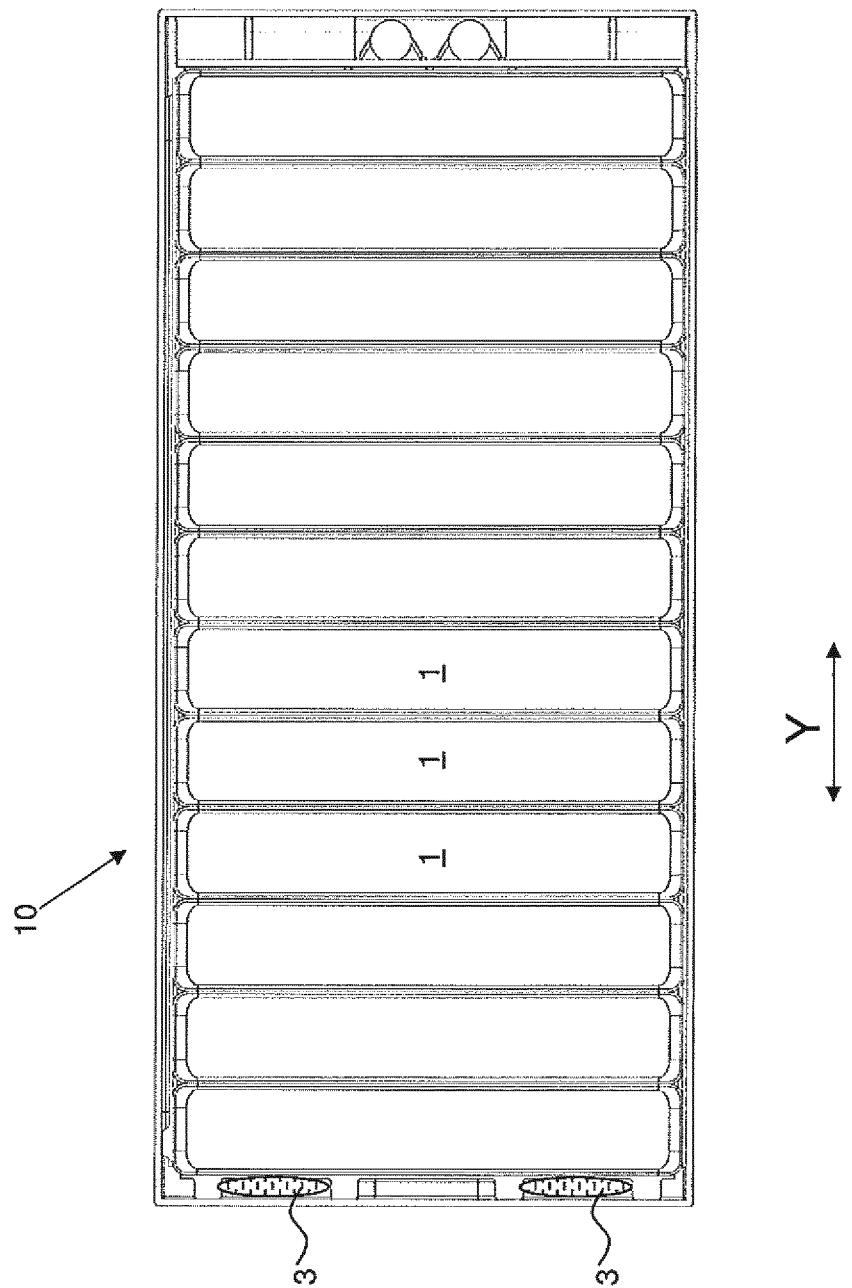
Figure 19:
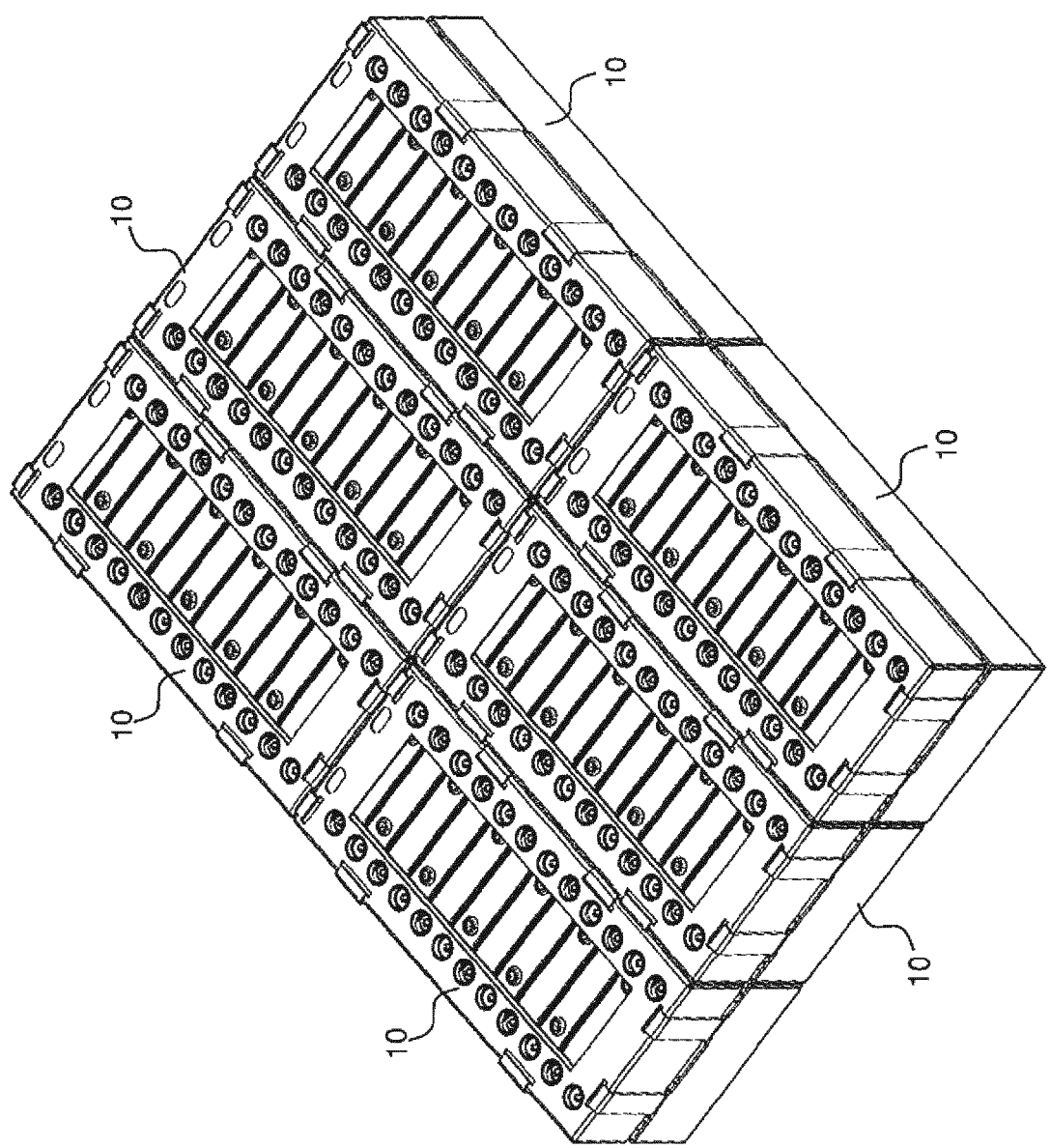
Figure 20:
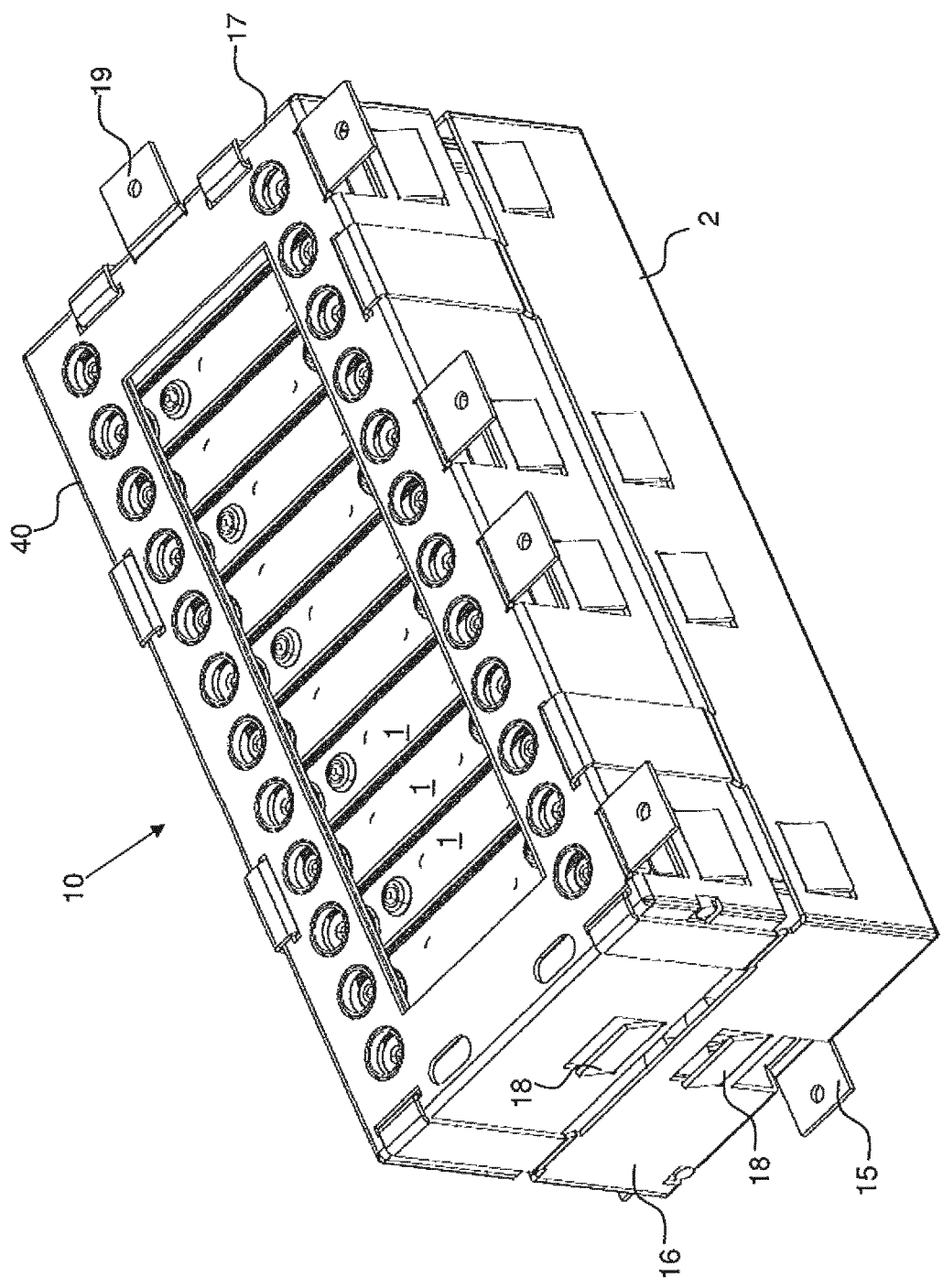
Figure 21:
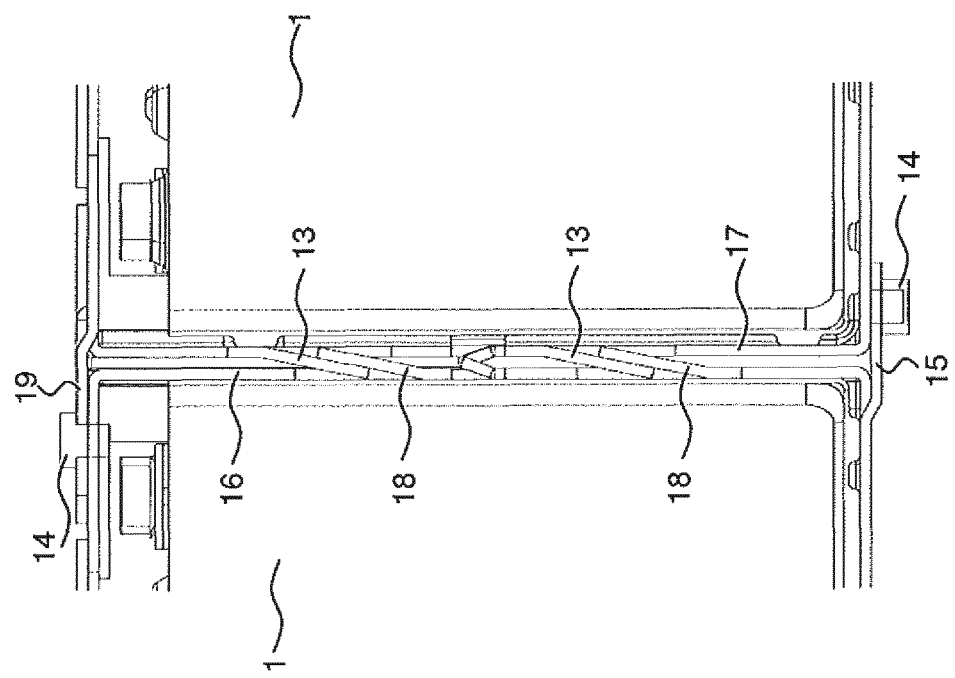
Figure 22:
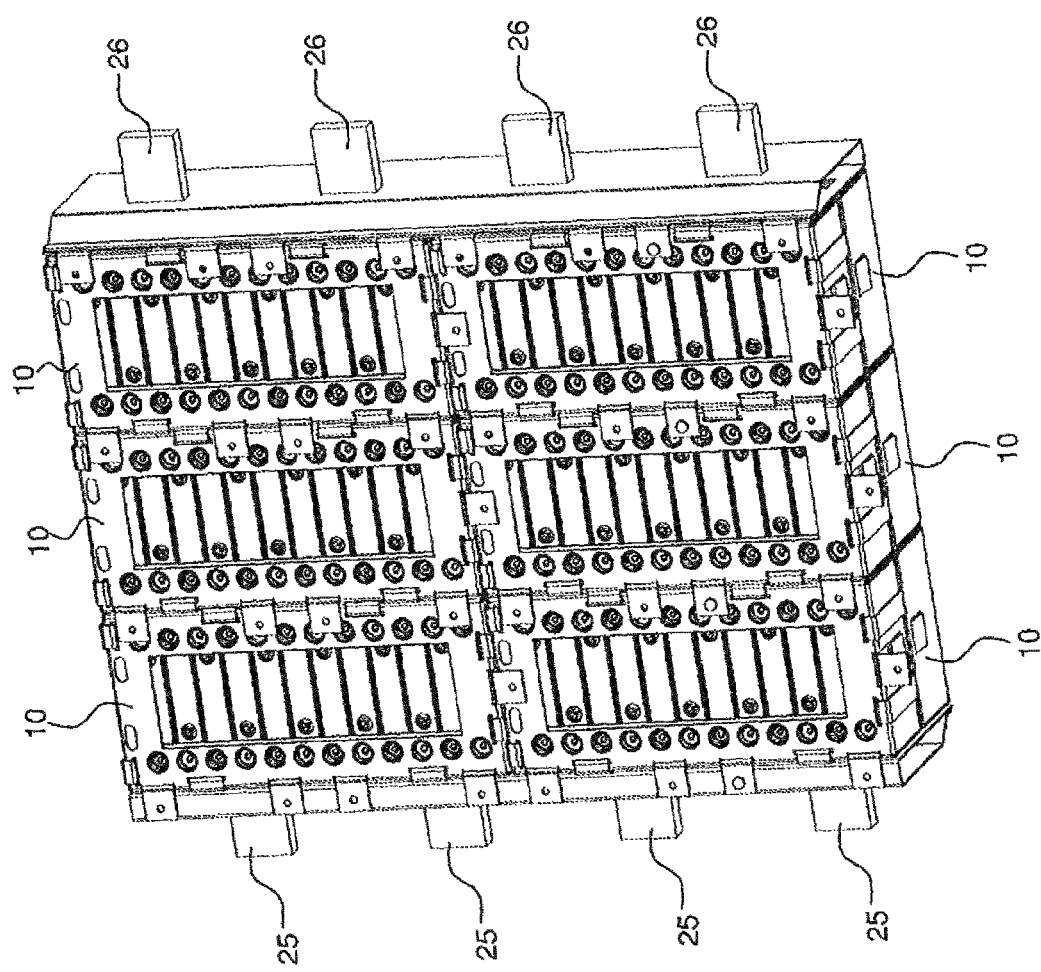

FIGS. 8 to 19 a multi cell battery module in different steps of its manufacture and FIGS. 20 to 21 a mechanical connection arrangement and FIG. 22 another embodiment of a multi cell battery module.

In the drawings same numerals refer to same elements.

FIGS. 1 and 2 show an assembly 10 with four elements 1 with a circular shape located within a common housing 2 which has e. g. a square shape. For example, the elements 1 could be round battery cells located in the common housing 2, viewed from above. In a space 9 between the elements 1 a hollow deformable and at least in a radial direction expandable fixation element 3 is located. FIG. 1 shows the fixation element 3 before it is filled with a filling material, FIG. 2 shows the fixation element 3 in a blown up state, where it is filled with a hardenable filling material. As can be seen in FIG. 2, the fixation element 3 adapts its shape to certain areas of the space 9 between the elements 1. Through the filling material the fixation element 3 is pressed against the elements 1, which are hold within the housing 2. As a result, the elements 1 are fixed relative to each other and they are also fixed within the housing 2 since the fixation element 3 presses them also against the housing walls.

In the embodiments of FIGS. 1 and 2, a first component of the assembly in the sense of claim 1 may be the upper left element 1, and a second component may be the upper right element 1.

FIGS. 3 and 4 show another embodiment of an assembly 10, where eight elements 1 with circular shape are located within a rectangular housing 2. The elements 1 could be again round battery cells viewed from above. The housing 2 could be a common housing for the battery cells. Further, a fixation element 3 in the form of a tube or hose is lead in a meandering shape from a point 4 through the housing 2 to an end point 5. The fixation element 3 can be e. g. a silicone tube. The starting point 4 comprises an injection opening where the filling material is injected into the fixation element 3. At the end point 5 the fixation element comprises an outlet opening for venting air from the fixation element 3 when the filling material is filled into the fixation element 3. FIG. 3 shows the fixation element 3 before the filling material is filled in. FIG. 4 shows the final state when the filling material has been filled in with a certain overload pressure. As can be seen, the fixation element 3 is radially expanded e. g. in areas 9, thereby fixing and clamping the elements 1 relative to each other and within the housing 2.

FIG. 5 shows a heat exchanger 50 which is manufactured as a blow moulded part from a plastic material. The heat exchanger has a meandering shape which is adapted to be aligned with round or cylindrical battery cells of a battery module. In general the heat exchanger 50 is used for heat exchanging purposes. It is also possible to use it for mounting and fixing purposes of the battery cells when filling with hardenable filling material instead of coolant. For that reason the heat exchanger 50 comprises a tube 3 which is lead in a meandering shape through the heat exchanger 50. The tube 3 acts as a fixing element. The tube 3 can be filled with the filling material through an injection opening 4, until an outlet opening 5 is reached. Any air within the tube 3 is released through the outlet opening 5. In this way the heat exchanger 50 can also be used as a cell adapter between the battery cells and a housing of the battery module. In this way the heat exchanger itself can serve as the fixation element for providing fixation between a first and a second component, namely between battery cells and/or a battery module housing. The principle described through the embodiments of FIG. 5 can be used both for prismatic and cylindrical battery cells.

FIG. 6 shows the process of filling the hardenable filling material into the fixation element 3. The fixation element 3 is guided through a housing, e. g. as described before using the FIGS. 1 to 4. The injection opening 4 of the fixation element 3 is connected by a non-elastic conduit 64 to a container 60 comprising the filling material 61. The container 60 can be provided e. g. in the form of a piston/cylinder-arrangement. The piston is charged with a force 62. Under the force 62 the filling material 61 is pressed by the piston into the fixation element 3. In the area of the outlet opening 5 a flow regulator 63, e. g. in the form of a throttle valve, is connected by a non-elastic conduit 65 to the fixation element 3. The flow regulator 63 allows opening and closing the fixation element in the area of the outlet opening 5.

The several steps of filling of the filling material 61 into the fixation element 3 is shown in FIG. 7. In a first step 1), the flow regulator 63 is in an open state. When the process of pressing the filling material 61 into the fixation element 3 is started, air is removed from the fixation element 3 due to the injection of the filling material 61. As can be seen in step 2), the fixation element is approximately half filled with a filling material 61, while the flow regulator is still opened. In step 3), the filling material 61 has reached a region of the fixation element 3 which is not used for fixation, namely a region which is close to the outlet opening 5 and the flow regulator 63. At this step 3), the flow regulator 63 is closed. Then, in step 4), due to the closed flow regulator, the pressure within the fixation element is increased through further pressing filling material 61 into the fixation element 3. In this way, the fixation element 3 expands in the radial direction.

FIGS. 8 to 19 show another embodiment of an assembly with a first and a second component which is fixed by the fixation element of the invention. In this embodiment a carrier component 7 is used as a carrier for the fixation element 3. The fixation element 3 and the carrier component 7 can be produced as one part out of plastic by welding two sheets of deep drawn plastic together or by blow moulding. The fixation element 3 can also be fixed to the carrier component by gluing. The fixation element 3 is preferably made out of plastic to provide electrical insulation. A second tube 33 which is also fixed to the carrier component 7 can be used as heat exchanger.

Figure 9:
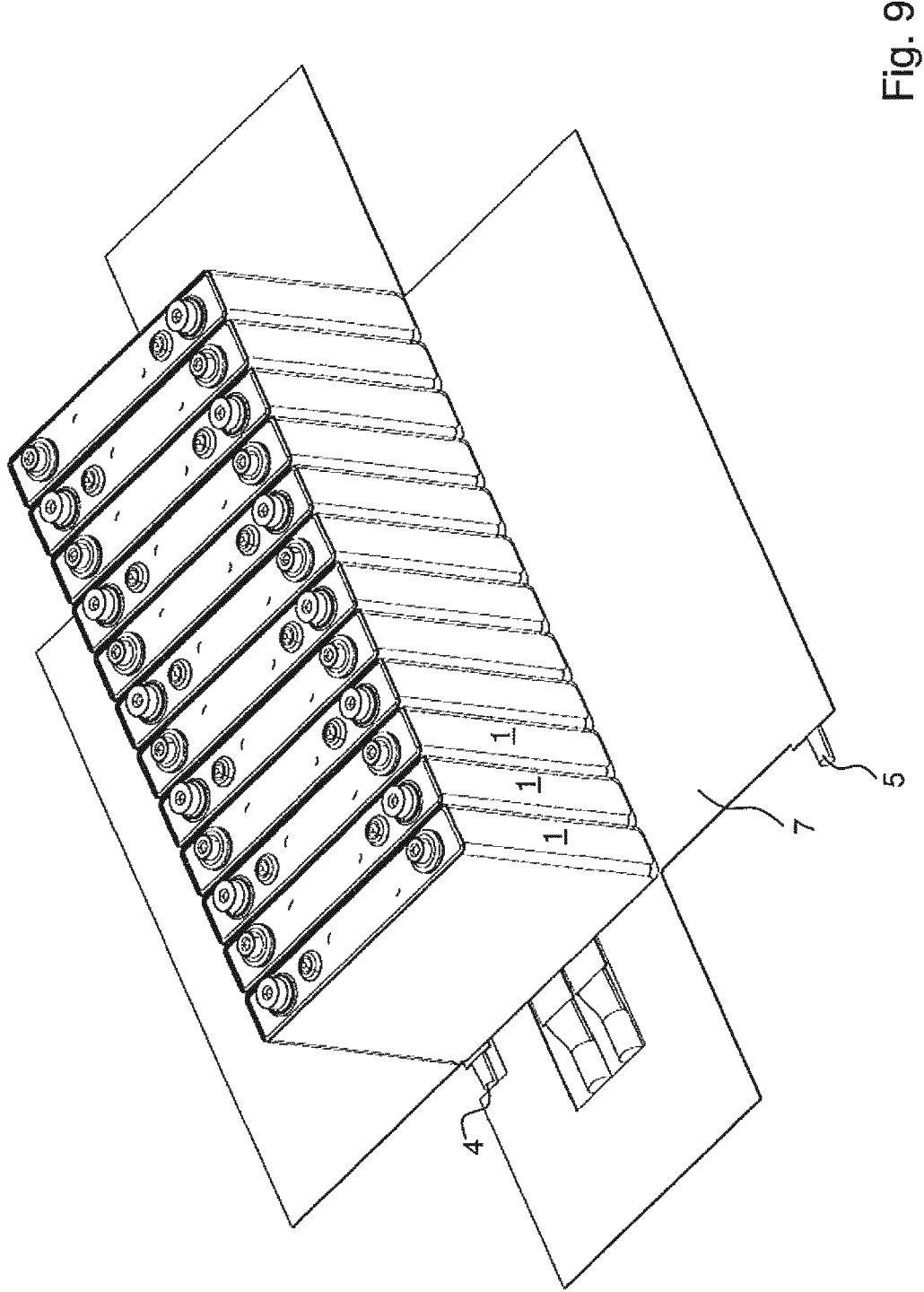

As can be seen in FIG. 9, the carrier component 7 is turned to the other side and a plurality of prismatic battery cells 1 is placed on the backside of the carrier component 7. It should be noted that the fixation element 3 cannot be seen in this view because it is located at the bottom side of the carrier component 7.

Figure 10:
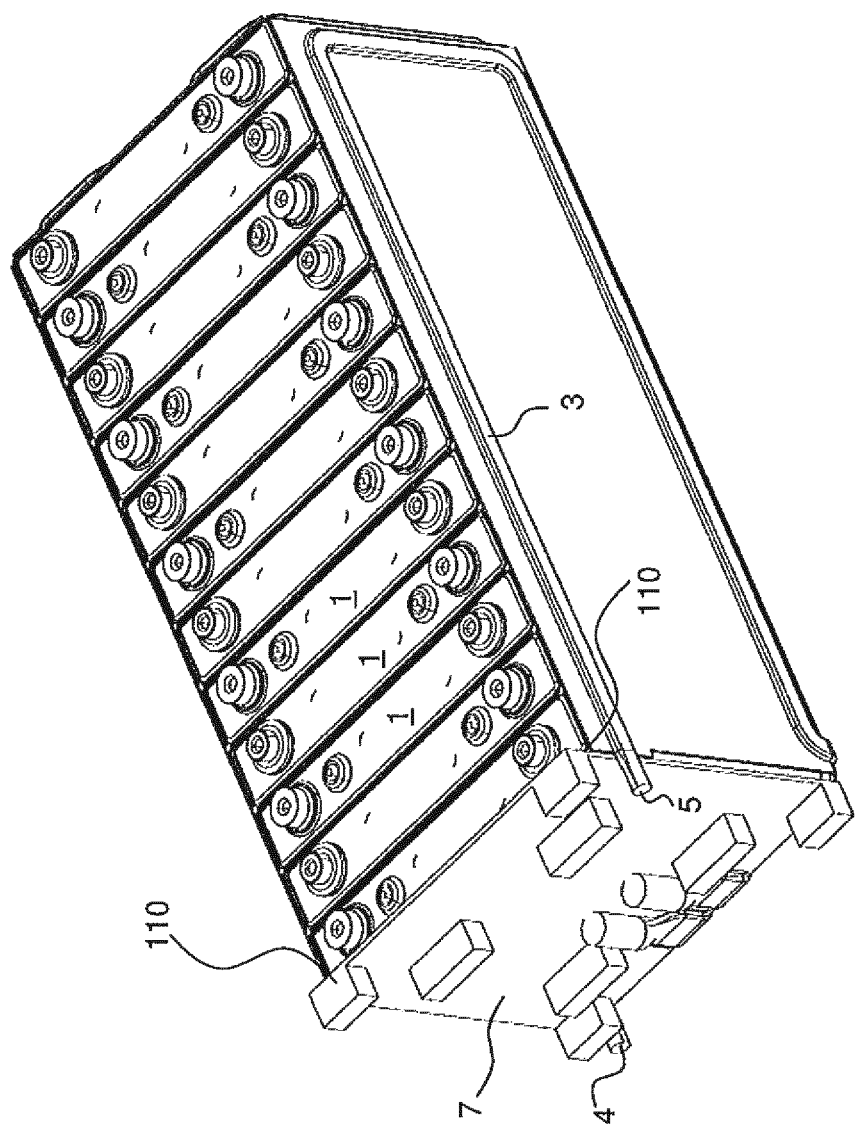
Figure 11:
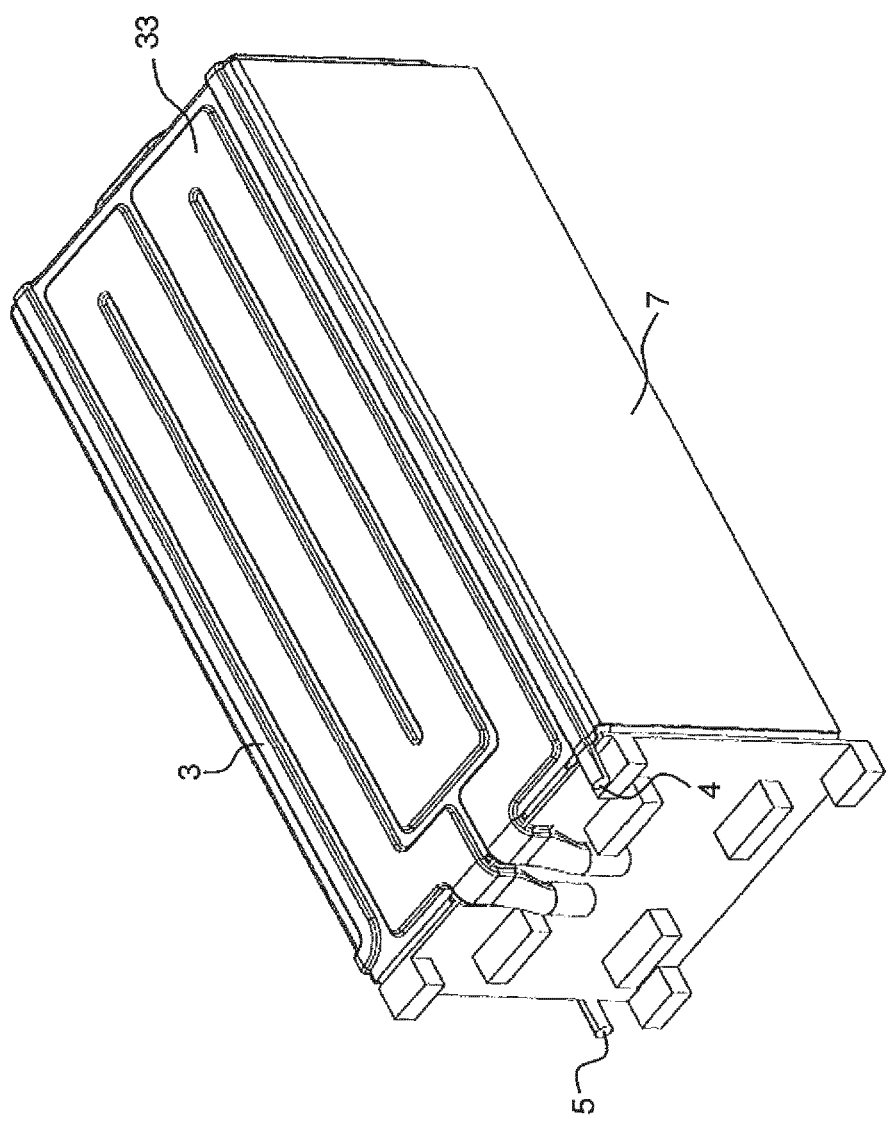

As shown in FIGS. 10 and 11, sidewalls of the carrier component 7 are folded to the side faces of the cells 1 by bending all four sides of the carrier component 7 upwards. In addition, fixations of sidewalls of the carrier component 7 can be provided at the corners 110. FIG. 11 shows the arrangement of FIG. 10 from the bottom side.

Figure 12:
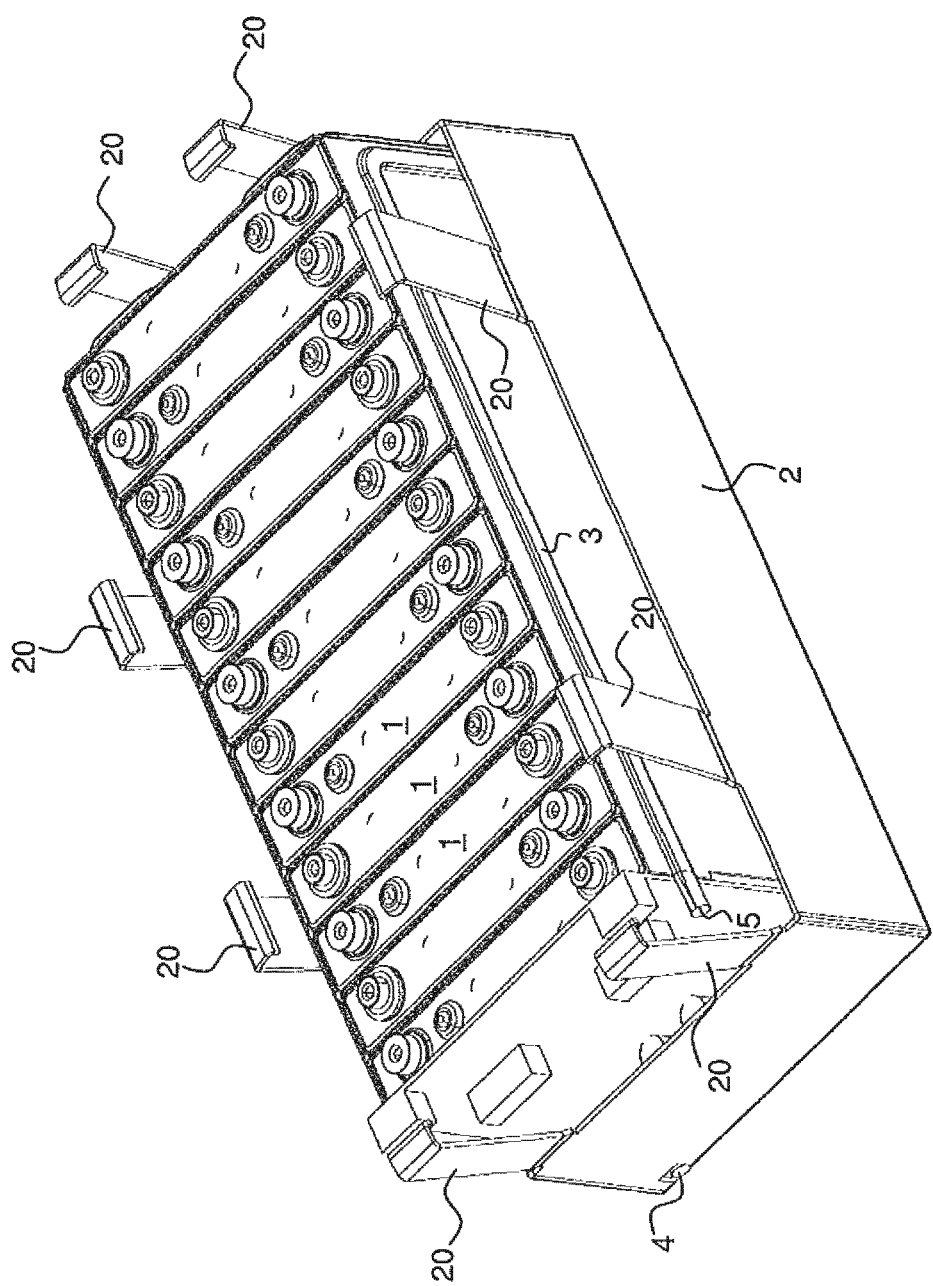

As can be seen in FIG. 12, the carrier component 7 together with the cells 1 is places within a lower housing part 2 which acts as a housing for the battery cell module. The lower housing part 2 can be manufactured e. g. from steel. The lower housing part 2 comprises a number of clamping hooks 20 which hold the battery cell module together when the mounting process is finished. In the mounting step shown in FIG. 12 the mounting hooks 20 need to be bent to the outside, as shown through the arrows.

Figure 13:
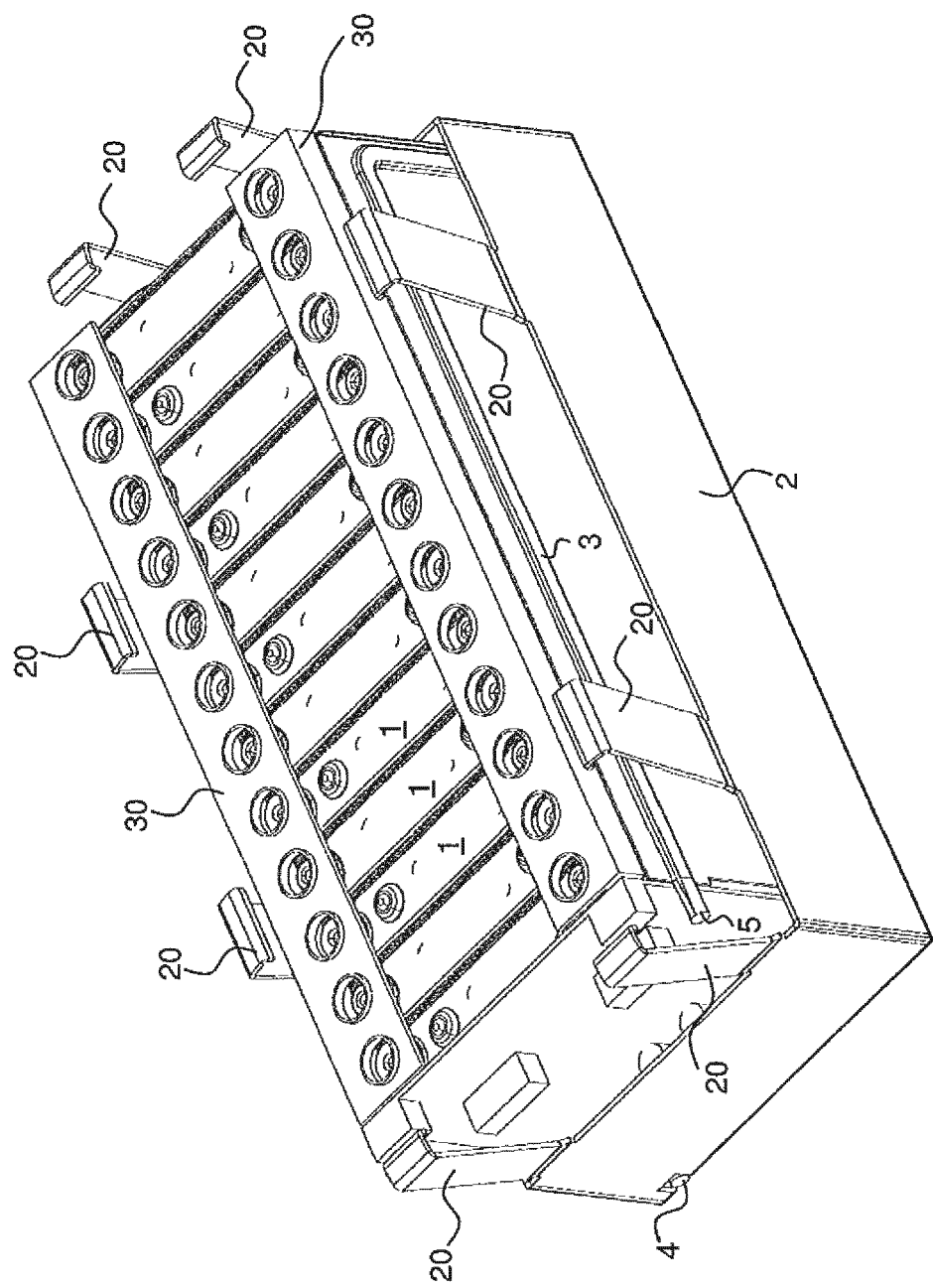

FIG. 13 shows the mounting of clamping bars 30 to the module. These clamping bars 30 are preferably made out of plastic. They press the cells 1 to the fixation element 3 below the cells 1 by taking the force from the clamping hooks 20. They also provide electrical insulation and mechanical protection of the bus bars (not shown) which electrically connect the battery cells 1.

Figure 14:
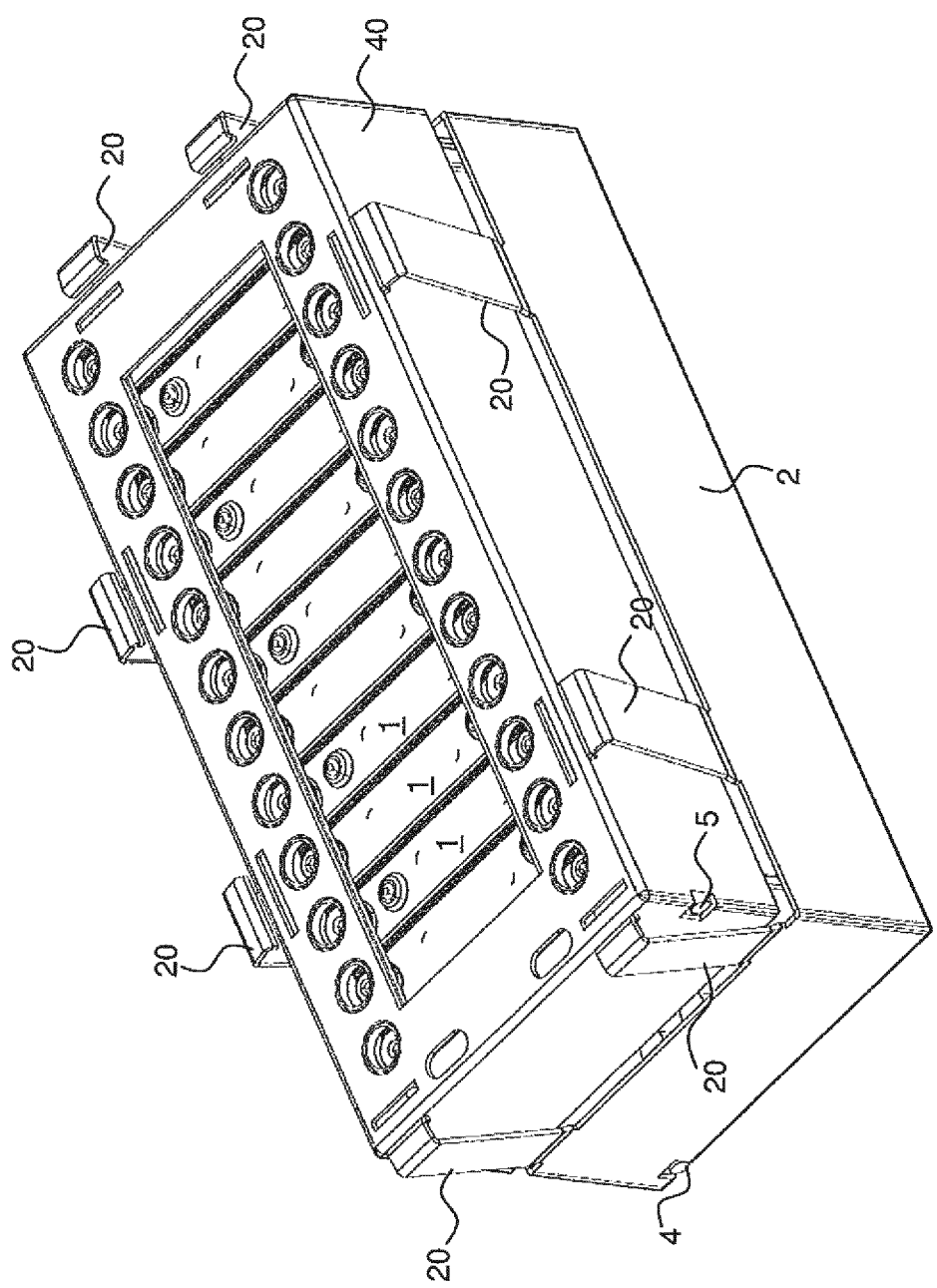
Figure 15:
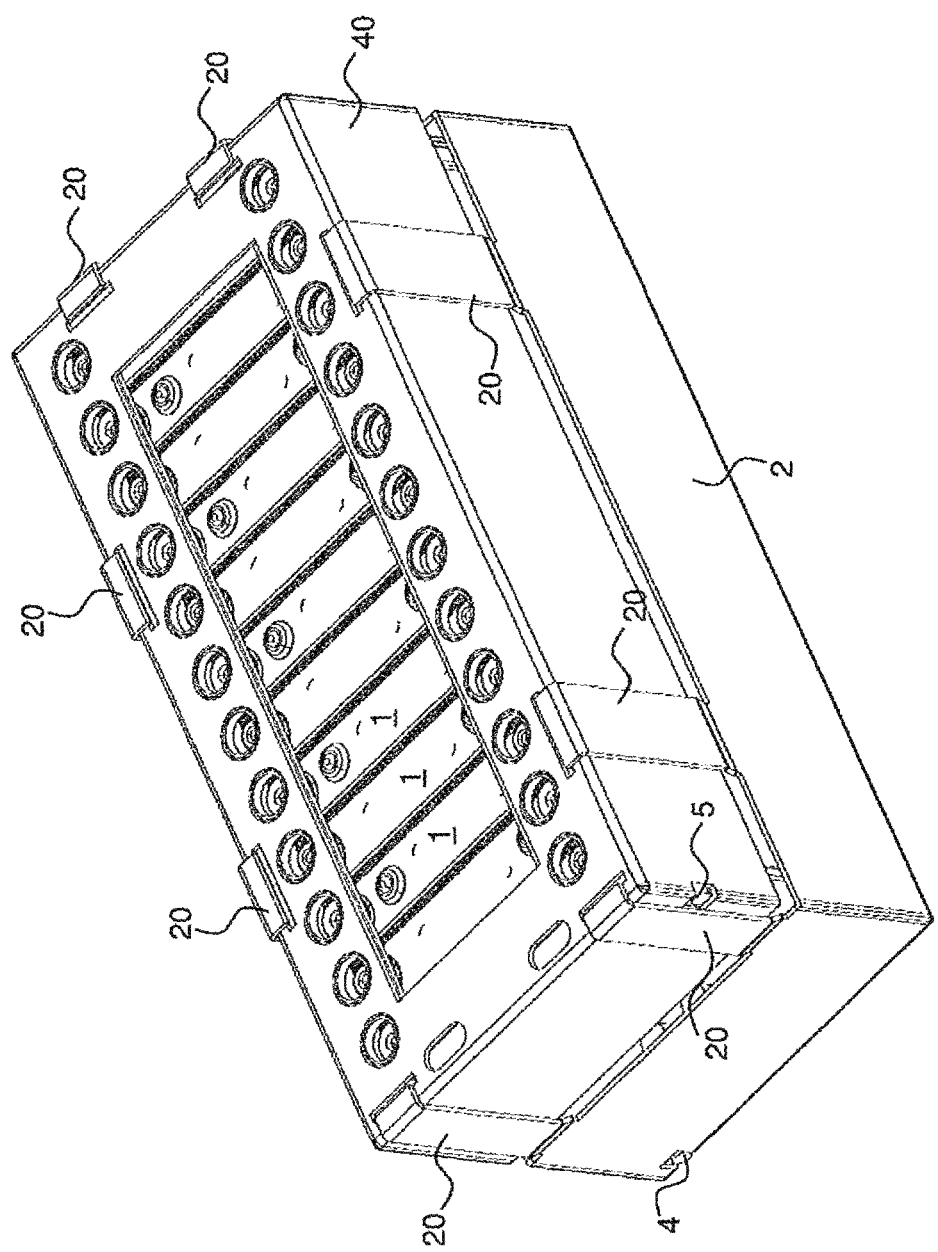

FIG. 14 shows that an upper housing part 40 is placed on the arrangement, namely on the clamping bars 30. The upper housing part 40 can be manufactured e. g. from steel. As can be seen in FIG. 15, the mounting hooks 20 are now snapped on the upper housing part 40.

Figure 16:
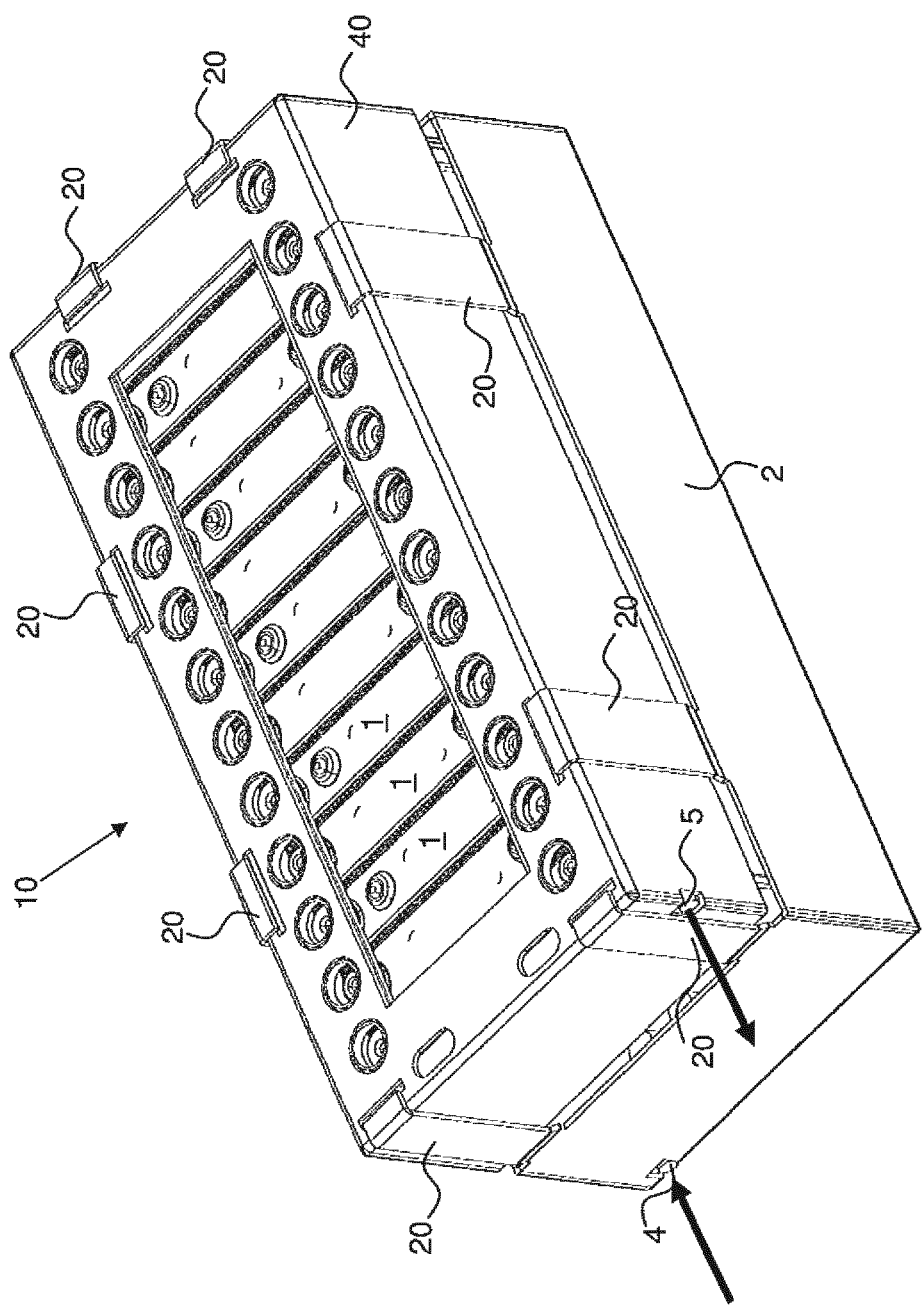
Figure 17:
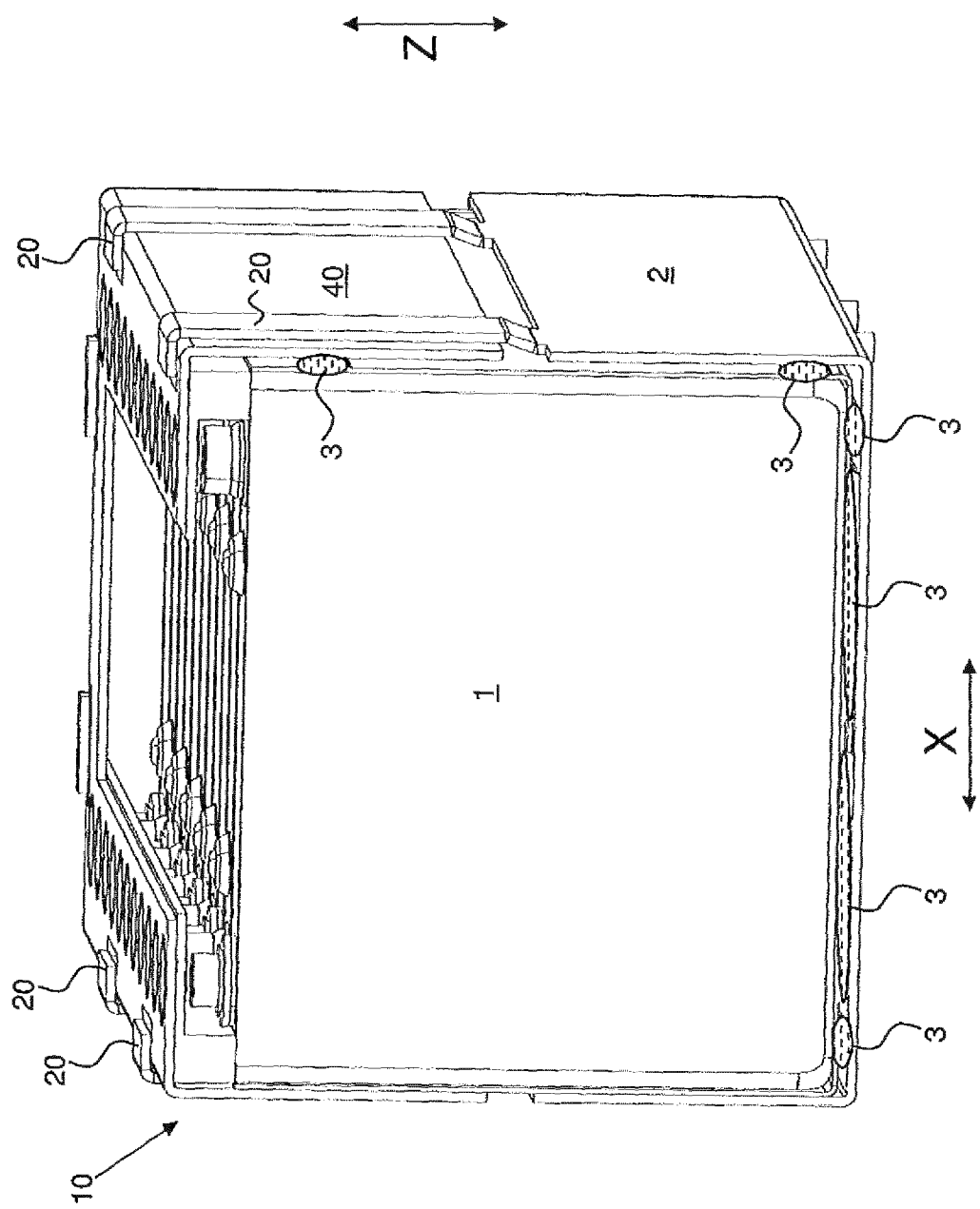

FIG. 16 shows the final fixation step of the several battery cells 1 within the assembly 10, namely the battery module. The filling material is now filled into the injection opening 4 of the fixation element 3 which has been fixed to the carrier component 7 at the beginning of the mounting process. Air escapes through the outlet opening 5. The process is performed as explained using the FIG. 7. As can be seen in FIG. 17, the fixation element 3 expands and fixes the carrier component 7 together with the battery cells 1 relative to the housing 2.

As can be seen in FIG. 18, there is also a fixation of the battery cells 1 in the longitudinal direction (Y-direction) of the battery module 10 through the fixation element 3.

It is further possible to mount several battery modules 10 together to a larger battery arrangement, as shown in FIG. 19. For the larger battery arrangement shown in FIG. 19 no additional housing is necessary, because the assembly which has been explained with FIGS. 8 to 18 already provides a robust and stable battery carrier which leads to a stable frame work if several battery modules 10 are mechanically linked together. Any further outer housing of the whole arrangement can be provided if necessary for protection against environmental influences, like humidity. However, there is no further mechanical stabilisation necessary.

The larger battery arrangement of FIG. 19 can be further equipped with outer battery fixation and vibration damping elements 25, 26. The battery fixation elements 25, 26 can be attached to the battery modules 10, namely their upper and/or lower housing parts 2, 40. This has the advantage that the carrier component 7 does not have to carry the battery weight. For that reason, the carrier component 7 can be made as a relatively cheap plastic part.

FIGS. 20 and 21 show an example for mounting the several battery modules 10 together to the larger battery arrangement of FIG. 19. The upper and/or lower housing parts 2, 40 can be provided with hooks 18 on a first side 16 and with jackets 13 on a second opposite side 17 of the housing. The hooks 17 on the first side 16 interact with the jackets 13 on the second side 17 of a neighbouring housing part. Further, for lateral fixation, screws 14 can be mounted into longitudinally extending wall sections 15, 19 which overlap with neighbouring housing parts. FIG. 20 shows a battery module 10 with such hooks 17 and jackets 13, as well as with longitudinally extending wall sections 18, 19 in an isometric view. FIG. 21 shows the connection between two neighbouring battery modules, wherein the battery modules are only partly shown. As can be seen, the jackets 13 interact with the hooks 18. Further screws 14 are screwed through the longitudinally extending wall sections 15, 19 and the overlapping housing parts.

Similar hooks and jackets and longitudinal extending wall sections can also be provided on other housing sides, as can be seen in FIG. 20.

FIG. 22 shows another embodiment of a multi cell battery module, composed of six battery modules 10 which are mechanically linked together as explained before.

On two opposing sides the multi cell battery module arrangement of FIG. 22 comprises carrier elements having battery fixation and vibration damping extensions 25, 26. With these battery fixation and vibration damping extensions 25, 26 the whole arrangement of FIG. 22 can be mounted e. g. in an electric or hybrid vehicle.

The invention claimed is:

1. An assembly of a battery module, comprising:
 a first and a second component which are fixed relative to each other by at least one fixation element, the fixation element extending into or through a space between the first and the second component, wherein the first component comprises a battery cell, and the second component comprises an outer housing of a battery assembly, and the battery cell is located within the outer housing; and a hardenable filling material disposed within the fixation element, wherein the fixation element is hollow, deformable and expandable in at least a radial direction if internally pressurized and wherein the fixation element is pressed by the filling material against the first and the second component.

2. The assembly of claim 1, wherein the outer shape of the fixation element at least, in certain areas, corresponds inversely to the outer shapes of the first and second component.

3. The assembly of claim 1, wherein the filling material is a liquid material before it hardens.

4. The assembly of claim 1, wherein the filling material in the fixation element is generally free of blow holes.

5. The assembly of claim 1, wherein the fixation element is connected to a heat exchanger arranged for cooling or heating the assembly or is made integrally with the heat exchanger as one component.

6. The assembly of claim 1, wherein the first component comprises a plurality of battery cells, and each battery cell of the plurality of battery cells having an own cell housing.

7. The assembly of claim 1, wherein the fixation element is fixed to a carrier component, wherein the first component is located at least partly within the carrier component and wherein the carrier component is located at least partly within the second component.

8. The assembly of claim 1, wherein the fixation element comprises a blow moulded plastic material.

9. The assembly of claim 1, wherein the fixation element comprises a plastic foil or deep drawn plastic sheets.

10. A method for producing an assembly of a battery module with a first and a second component, comprising:
preparing the first and the second component with a fixation element, wherein the fixation element is hollow, expandable, and deformable at least in a radial direction if internally pressurized;
leading the fixation element through a space between the first and the second component, wherein the fixation element is initially not filled with a filling material wherein the first component comprises a battery cell, the second component comprises an outer housing of a battery assembly, and the battery cell is located within the outer housing;
then filling a hardenable filling material into the fixation element until the fixation element is pressed through the filling material against the first and the second component and then the filling material hardens or is hardened.

11. The method of claim 10, comprising filling the filling material into the fixation element under overload pressure.

12. The method of claim 10, comprising modifying the outer shape of the fixation element with the filling material during the process of filling of the filling material into the fixation element such that the fixation element adapts its outer shape at least in certain areas to outer shapes of the first and the second component.

13. The method of claim 10, comprising connecting the fixation element to a carrier component, then inserting the first component into the carrier component such that the first component is at least partly surrounded by the fixation element, then fixing the carrier component with the inserted first component to or within the second component such that it is at least partly surrounded by the second component.

14. The method of claim 13, comprising bending or folding the carrier component from an initial shape into a shape suitable for insertion of the first component, wherein the fixation element is fixed to the carrier component when the carrier component is in its initial shape.

15. An assembly of a battery module, comprising:
a first and a second component which are fixed relative to each other by at least one fixation element, the fixation element extending into or through a space between the first and the second component, wherein the fixation element is connected to a heat exchanger arranged for cooling or heating the assembly or is made integrally with the heat exchanger as one component; and
a hardenable filling material disposed within the fixation element, wherein the fixation element is hollow, deformable and expandable in at least a radial direction if internally pressurized and wherein the fixation element is pressed by the filling material against the first and the second component.

16. An assembly of a battery module, comprising:
a first and a second component which are fixed relative to each other by at least one fixation element, the fixation element extending into or through a space between the first and the second component, wherein the fixation element is fixed to a carrier component, wherein the first component is located at least partly within the carrier component and wherein the carrier component is located at least partly within the second component; and
a hardenable filling material disposed within the fixation element, wherein the fixation element is hollow, deformable and expandable in at least a radial direction if internally pressurized and wherein the fixation element is pressed by the filling material against the first and the second component.

17. A method for producing an assembly of a battery module with a first and a second component, comprising:
preparing the first and the second component with a fixation element, wherein the fixation element is hollow, expandable, and deformable at least in a radial direction if internally pressurized;
leading the fixation element through a space between the first and the second component, wherein the fixation element is initially not filled with a filling material, wherein the first component comprises a battery cell, the second component comprises an outer housing of a battery assembly, and the battery cell is located within the outer housing;
connecting the fixation element to a carrier component;
inserting the first component into the carrier component such that the first component is at least partly surrounded by the fixation element;
fixing the carrier component with the inserted first component to or within the second component such that it is at least partly surrounded by the second component;
then filling a hardenable filling material into the fixation element until the fixation element is pressed through the filling material against the first and the second component and then the filling material hardens or is hardened.

18. The method of claim 17, comprising bending or folding the carrier component from an initial shape into a shape suitable for insertion of the first component, wherein the fixation element is fixed to the carrier component when the carrier component is in its initial shape.

* * * * *